Feb. 1, 1966 L. L. COUSINS 3,232,578
PIVOTED DISC VALVE HAVING A PARTICULAR MOUNTING ARRANGEMENT
Filed March 14, 1963

INVENTOR.
LEROY L. COUSINS
BY *Elliott & Pastoriza*
ATTORNEYS.

United States Patent Office 3,232,578
Patented Feb. 1, 1966

3,232,578
PIVOTED DISC VALVE HAVING A PARTICULAR MOUNTING ARRANGEMENT
Leroy L. Cousins, Lynwood, Calif., assignor to Coastal Dynamics Corporation, a corporation of California
Filed Mar. 14, 1963, Ser. No. 265,231
2 Claims. (Cl. 251—302)

This invention relates generally to valves and more particularly to an improved fluid valve particularly useful in dental work for controlling suction of fluids from a dental patient's mouth.

Conventional suction apparatus for use in dental work usually includes a curved plastic tube adapted to hang from the patient's mandible and suck fluids from the patient's mouth. A valve is usually provided in the flexible hose connected to the tube to enable control of the suction or to terminate the suction. As a consequence, the denist or his nurse must hold the curved plastic tube portion in the patient's mouth with one hand while operating the valve with the other hand. It would be highly desirable accordingly, if a simple manually operate valve of compact size could be incorporated in the suction line passing to the patient's mouth and so designed that the dentist or his assistant may manipulate the position of the suction tube within the patient's mouth with one hand and also open or close the valve with the same hand.

With the foregoing in mind, it is accordingly a primary object of this invention to provide a novel fluid valve particularly useful in dental work in which a suction tube structure incorporating the valve may be properly positioned with one hand and the valve turned on or off with the same hand.

Other objects of this invention are to provide an improved dental suction valve structure which is compact, streamlined in appearance, and extremely reliable in operation.

Briefly, these and other objects and advantages of this invention are attained by providing an elongated body member having a central fluid passage terminating in exit and entrance openings. A central portion of this body member includes an arcuate cut out defining a cradle structure for receiving a disc-shaped valve member. The disc-shaped valve member in turn includes an off-center opening adapted to register with the central fluid passage when the valve disc is received in the cradle. The cradle itself serves to mount the valve disc for rotation so that manual rotation of the disc will remove the off-center opening from registration with the central fluid passage and move another portion of the disc into the fluid passage to block further passing of fluid therethrough.

The arcuate cut-out and radius of the valve disc are such that a peripheral portion of the valve disc extends outside the body member or is exposed in such manner as to be readily rotatable by the thumb or one or more of the fingers of a user's hand holding the body member.

A better understanding of the invention will be had by now referring to a preferred embodiment thereof as illustrated in the accompanying drawings in which.

Figure 1:
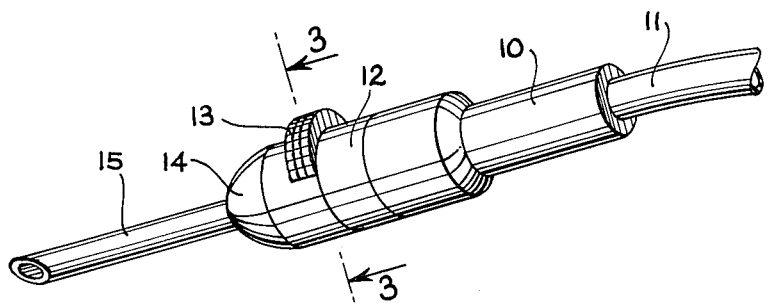
FIG. 1 is an overall perspective view of the improved fluid valve of this invention.

Referring first to FIG. 1 the fluid valve comprises an elongated member having a handle 10 receiving a flexible hose 11. The flexible hose 11 has one end connected to an exit opening within the body member and its other end connected to suction apparatus (not shown). The central portion of the body member includes a valve plate 12 and a valve disc 13 mounted for rotation about an axis parallel to but laterally spaced from the axis of the elongated member. As shown, the valve disc 13 is sandwiched in part between the valve plate 12 and a nose piece 14. The end of the nose piece 14 in turn is arranged to receive a rigid plastic tube 15 having one end connecting with an entrance opening in the elongated body member and its other end adapted to be positioned in a patient's mouth.

The arrangement in FIG. 1 is such that a person may hold the handle 10 and rotate the peripheral exposed portion of the valve disc 13 all with one hand to open the fluid passage within the body member or close this fluid passage. The manner in which the foregoing takes place will be evident by now referring to the exploded view of FIG. 2.

Figure 2:
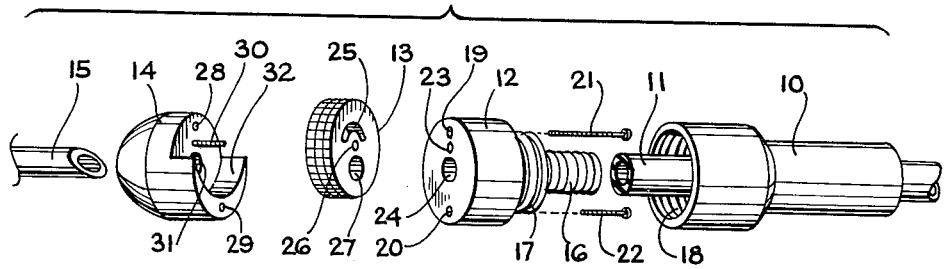
FIG. 2 is an exploded perspective view of the valve structure shown in FIG. 1.

As shown in FIG. 2, the handle 10 is arranged to receive the flexible tube 11 through an internal passage. The inner end of this flexible tube 11 in turn is arranged to be secured to the valve plate 12 this valve plate being provided with a nipple portion 16 over which the end of the hose 11 may be stretched. As shown, the valve plate includes external threads 17 for threadedly connecting to internal threads 18 in the handle.

The valve plate 12 includes two screw holes 19 and 20 for receiving screws 21 and 22 in order to secure the valve plate 12 to the nose piece 14. Also, the valve plate includes an aligning hole 23 and a central bore 24 constituting part of the central fluid passage in the body member.

The valve disc 13 as shown includes a curved opening 25 the purpose for which will become clearer as the description proceeds. Also, the valve disc 13 includes a central opening 26 at the geometrical center thereof and positioned such as to be in alignment with the alignment hole 23 in the valve plate 12. The valve disc assembly is completed by an off-center opening 27 arranged to register with the opening 24 of the valve plate 12 and the central fluid passage when the valve disc 13 is in a first rotated position.

Referring now to the nose piece 14, it will be noted that the far end portion thereof is arranged to receive the rigid plastic tube 15 in frictional engagement. The other end of the nose piece 14 is provided with threaded screw openings 28 and 29 for receiving the screws 21 and 22 when the various components are assembled. Also provided is an alignment pin 30 projecting from the inner end of the nose piece 14. As shown, this inner end of the nose piece includes an arcuate cut out 32 defining a cradle structure. This cradle structure 32 is formed to receive the disc 13 the radius of curvature of the cradle 32 corresponding to the radius of the disc.

In assemblying the various components illustrated in FIG. 2, the rigid plastic tube 15 is first frictionally inserted in the left end of the nose piece 14. The disc 13 may then be positioned in the cradle 32 with the alignment pin 30 passing through the center opening 26 of the disc 13. The disc 13 is thus rotatably mounted within the body member. After these two elements have been assembled, the valve plate 12 is positioned juxtaposed the flat surface of the valve disc 13 with the alignment pin 30 passing into the alignment opening 23 of the valve plate. The screws 21 and 22 may then be passed through the screw openings 19 and 20, the upper screw 21 also passing through the curved cut out 25 of the valve disc 13. These screws are then threaded in the openings 28 and 29 in the nose piece 14. The valve disc 13 is thus sandwiched between the arcuate cut out portion of the nose piece and the flat face of the valve plate 12.

The nipple portion 16 of the valve plate 12 is then inserted within the end of the tube 11 after the tube 11 has been passed through the handle portion 10. The handle portion 10 may then simply be threaded onto the threads 17 of the valve plate to complete the entire assembly.

The far end of the flexible hose 11 connects to a suitable source of suction (not shown) so that when the rigid plastic tube 15 at the other end of the body member is inserted in a patient's mouth, fluid may be sucked through the central passage of the elongated member.

Figure 3:
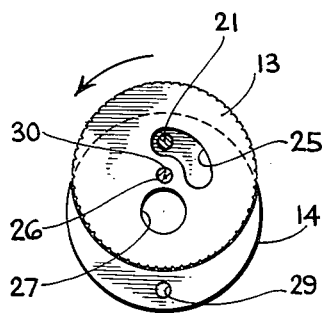
FIG. 3 is a cross section taken in the direction of the arrows 3—3 of FIG. 1 with the valve in a first open position; and, FIG. 4 is a view similar to FIG. 3 but showing the relative positions of valve components when the valve is in a second closed position.

With particular reference to FIG. 3 the valve is shown in open position wherein the off center opening 27 in the valve disc 13 is in registration with the openings 31 in the nose piece 14 and 24 in the valve plate 12. In this position, it should be noted that the screw 21 passing through the curved cut out 25 bears against the left edge of this cut out so that when the valve disc 13 is rotated in a clockwise direction as viewed in FIG. 3 it will be stopped in a position in which its off center opening 27 registers with the fluid passage in the body member.

Figure 4:
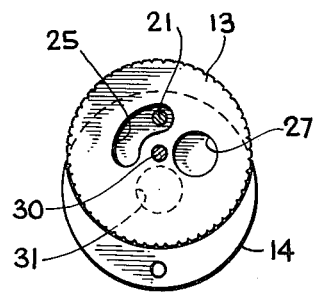

Referring now to FIG. 4, when the valve disc 13 is rotated in a counter clockwise direction about its own axis corresponding to the axis of the alignment pin 30, the off-center opening 27 is moved out of registration with the central fluid passage opening 31 in the nose piece 14 so that another portion of the valve disc 13 intercepts this fluid passage and thus blocks flow of fluid. In the second position illustrated in FIG. 4, it will be noted that the screw 21 has now engaged the right hand end of the curved cut out 25 to serve as a stop.

The opposite surfaces of the valve disc are smoothly ground as are also the facing surfaces of the valve plate 12 and the nose piece 14 so that no fluid leaks will occur when the valve disc is in its second or closed position.

The operation of the fluid valve will be evident from the foregoing description. Thus referring to FIG. 1 the end of the rigid plastic tube 15 is inserted in a patient's mouth and properly positioned at any desired location. With the same hand used to hold the body, the valve disc 13 may then be rotated between its first and second positions shown in FIGS. 3 and 4 to open or close the fluid passage connecting the passage in the tube 15 with the flexible hose 11. Further, intermediate positions of the valve disc 13 may be provided so that the rate of suction flow can be controlled. It will be evident that the fluid valve may very easily be held and manipulated with only one hand.

While only a preferred embodiment of the invention has been shown and described with respect to dental operations, it should be evident to those skilled in the art that various changes falling clearly within the scope and spirit of this invention may take place. The fluid valve is therefore not to be thought of as limited to the one embodiment set forth merely for illustrative purposes.

What is claimed is:

1. A dental suction valve comprising in combination: an elongated body member having an internal central fluid passage terminating in an exit opening at one end and an entrance opening at its other end, said body member including a manual holding handle threadedly connected to the remaining portion of said body member adjacent to said one end, the said other end of said body member terminating in a nose piece having an inner end terminating in a flat ground surface defined by an arcuate cut out portion, a central portion of said body member including a valve plate threadedly connected to said handle on one end, the other end of said valve plate terminating in a flat smoothly ground surface juxtaposed said flat ground surface of said nose piece; and a valve disc having flat opposite smoothly ground surfaces positioned in said arcuate cut-out portion so that its axis runs parallel to and spaced from the longitudinal axis of said body member, and its opposite surfaces are in fluid tight engagement with said smoothly ground surfaces of said nose piece and valve plate, a peripheral portion of said disc extending from the side of said body member to be exposed so that it may be manually rotated to rotate said disc about its own axis, said disc including an off-center opening adapted to register with said central fluid passage when in a first position and to be moved out of registration with said fluid passage so that another portion of said disc blocks said fluid passage when said disc is rotated to a second position, a portion of said disc includes a curved opening; screws for securing said valve plate to said nose piece, one of said screws passing through said curved opening to function as a stop and thereby limit rotation of said disc between said first and second positions.

2. A valve according to claim 1, including an aligning pin extending from said nose piece and passing through the geometrical center of said disc to provide a rotational guide for said disc and hold said disc within said arcuate cut-out.

References Cited by the Examiner

UNITED STATES PATENTS

| 1,014,070 | 1/1912 | Laxton | 251—302 X |
| 2,016,998 | 10/1935 | Hartke | 251—340 |
| 2,360,389 | 10/1944 | Bergman | 251—301 XR |
| 2,885,782 | 5/1959 | Groves | 32—33 |

FOREIGN PATENTS

| 66,670 | 10/1957 | France. |
| 788,941 | 1/1958 | Great Britain. |

ISADOR WEIL, *Primary Examiner.*